United States Patent [19]

Spatafora

[11] Patent Number: 5,595,280
[45] Date of Patent: Jan. 21, 1997

[54] METHOD AND DEVICE FOR FORMING GROUPS OF FLAT ARTICLES ON EDGE

[75] Inventor: Mario Spatafora, Bologna, Italy

[73] Assignee: Azionaria Costruzioni Macchine Automatiche A.C.M.A. S.p.A., Bologna, Italy

[21] Appl. No.: 419,825

[22] Filed: Apr. 11, 1995

[30] Foreign Application Priority Data

Apr. 13, 1994 [IT] Italy ................................ BO94A0156

[51] Int. Cl.$^6$ ................................................ B65B 35/00
[52] U.S. Cl. .................. 198/429; 414/798.2; 414/798.7; 414/786
[58] Field of Search ............................ 414/798.2, 798.9, 414/798.5, 798.6, 798.7, 786; 198/408, 429, 625, 430, 468.6

[56] References Cited

U.S. PATENT DOCUMENTS

| | | | |
|---|---|---|---|
| 2,905,341 | 9/1959 | Anderson | 414/798.5 X |
| 3,084,783 | 4/1963 | Morton et al. | 414/798.5 X |
| 3,570,647 | 3/1971 | Meikle et al. | 198/468.6 |
| 4,053,066 | 10/1977 | Lynch | 414/798.5 |
| 4,176,993 | 12/1979 | Luginbühl | 414/798.6 |
| 4,320,826 | 3/1982 | Kramer et al. | 198/430 |
| 4,491,167 | 1/1985 | Lange et al. | 198/625 X |
| 4,527,438 | 7/1985 | Fosslien | 198/625 X |
| 4,590,743 | 5/1986 | Hardage | 53/446 |
| 4,921,398 | 5/1990 | Fluck | 414/798.5 X |
| 5,035,135 | 7/1991 | Fukusaki et al. | 198/408 X |
| 5,040,662 | 8/1991 | Clark et al. | 198/408 |

FOREIGN PATENT DOCUMENTS

| | | | |
|---|---|---|---|
| 0538765 | 4/1993 | European Pat. Off. . | |
| 2101973 | 1/1983 | United Kingdom . | |
| 2219285 | 12/1989 | United Kingdom . | |
| 2250969 | 6/1992 | United Kingdom | 198/408 |
| WO92/01604 | 2/1992 | WIPO . | |

*Primary Examiner*—David A. Bucci
*Attorney, Agent, or Firm*—Christensen O'Connor Johnson & Kindness PLLC

[57] ABSTRACT

A method and device for forming groups of flat articles on edge, whereby articles, laid flat, arranged with a first spacing on a conveyor surface, and forming a first succession traveling in a first direction, are picked up one by one to form a second succession wherein the articles are equally spaced with a second spacing; the second succession is fed to a transfer station in which each article lies in a given plane; and the articles are then fed, in a second direction perpendicular to the given plane in the transfer station, to a withdrawal station where they are withdrawn in groups, each consisting of a number of articles on edge, in a third direction crosswise to the second direction.

24 Claims, 3 Drawing Sheets

METHOD AND DEVICE FOR FORMING GROUPS OF FLAT ARTICLES ON EDGE

BACKGROUND OF THE INVENTION

The present invention relates to a method of forming groups of flat articles on edge.

The present invention is especially suitable for use in the food industry for grouping flat articles such as biscuits or similar, to which application the following description refers purely by way of example.

One known method of forming groups of flat articles on edge is described in U.S. Pat. No. 5,058,725, wherein the articles, laid flat and fed successively to the outlet of a conveyor surface, are positioned on edge as they travel along a curved channel extending downwards from the conveyor outlet; are withdrawn, on edge, from the bottom end of the curved channel by a pocket conveyor; and are fed, spaced apart, to a follow-up user device.

Though advantageous for forming groups of rigid articles of a certain consistency, such as sweets, the above method presents serious drawbacks when dealing with fragile articles such as biscuits. In this case, in fact, each biscuit at the bottom end of the curved channel supports all the others stacked on edge along the channel, so that, when it is withdrawn from the bottom of the stack, the others are jogged down along the channel, thus resulting in repeated impact which, though safely withstandable by articles such as sweets, may result in crumbling of the biscuits inside the curved channel.

SUMMARY OF THE INVENTION

It is an object of the present invention to provide a method of forming orderly groups of flat articles on edge, in particular fragile articles such as biscuits or similar, designed to overcome the aforementioned drawbacks.

According to the present invention, there is provided a method of forming groups of flat articles on edge, the method comprising the step of feeding a first succession of said articles, laid flat on a conveyor surface and with a first spacing, in a first given direction to a pickup station; removing the articles one by one off the conveyor surface and from the first succession at the pickup station, to form a second succession wherein the articles are equally spaced with a given second spacing; feeding the second succession to a transfer station in such a manner that each article in the second succession lies in a given plane at the transfer station; feeding the articles from the transfer station to a withdrawal station in a second direction substantially perpendicular to said plane, to form a third succession wherein the articles are arranged on edge in relation to one another and are equally spaced with a third spacing; and successively forming groups, each comprising a number of said articles on edge, by withdrawing each said number of articles from said third succession in a third direction crosswise to said second direction.

In the preferred embodiment, the second and third directions extend in a substantially vertical plane, and the articles are withdrawn in the third direction by an extracting mechanism that defines a pocket and uses an actuator for moving an extracting element back and forth in the third direction through a conveyor that feeds the articles from the transfer station to the withdrawal station.

The present invention also relates to a device for forming groups of flat articles on edge.

According to the present invention, there is provided a device for forming groups of flat articles on edge, the device comprising a conveyor surface for a first succession of said articles laid flat and traveling with a first spacing a first given direction; first conveyor means for successively transferring said articles between a pickup station on the conveyor surface and a transfer station, the first conveyor means presenting a succession of seats for respectively receiving said articles, laid flat, at the pickup station, and for feeding them to the transfer station in a second succession wherein the articles are equally spaced with a second spacing, and in such a manner that each article lies in a given plane at the transfer station; second conveyor means for feeding said articles from the transfer station in a second direction perpendicular to said plane, and forming a third succession wherein the articles are equally spaced with a third spacing; and extracting means for withdrawing groups of said articles on edge from the second conveyor means in a third direction crosswise to said second direction.

In the preferred embodiment, the second and third directions extend in a substantially vertical plane, and the extracting means includes an extracting element defining a pocket and actuating means for moving an extracting element back and forth in the third direction through the second conveyor means.

BRIEF DESCRIPTION OF THE DRAWINGS

A non-limiting embodiment of the present invention will be described by way of example with reference to the accompanying drawings, in which.

DETAILED DESCRIPTION OF TEE INVENTION

Figure 1:
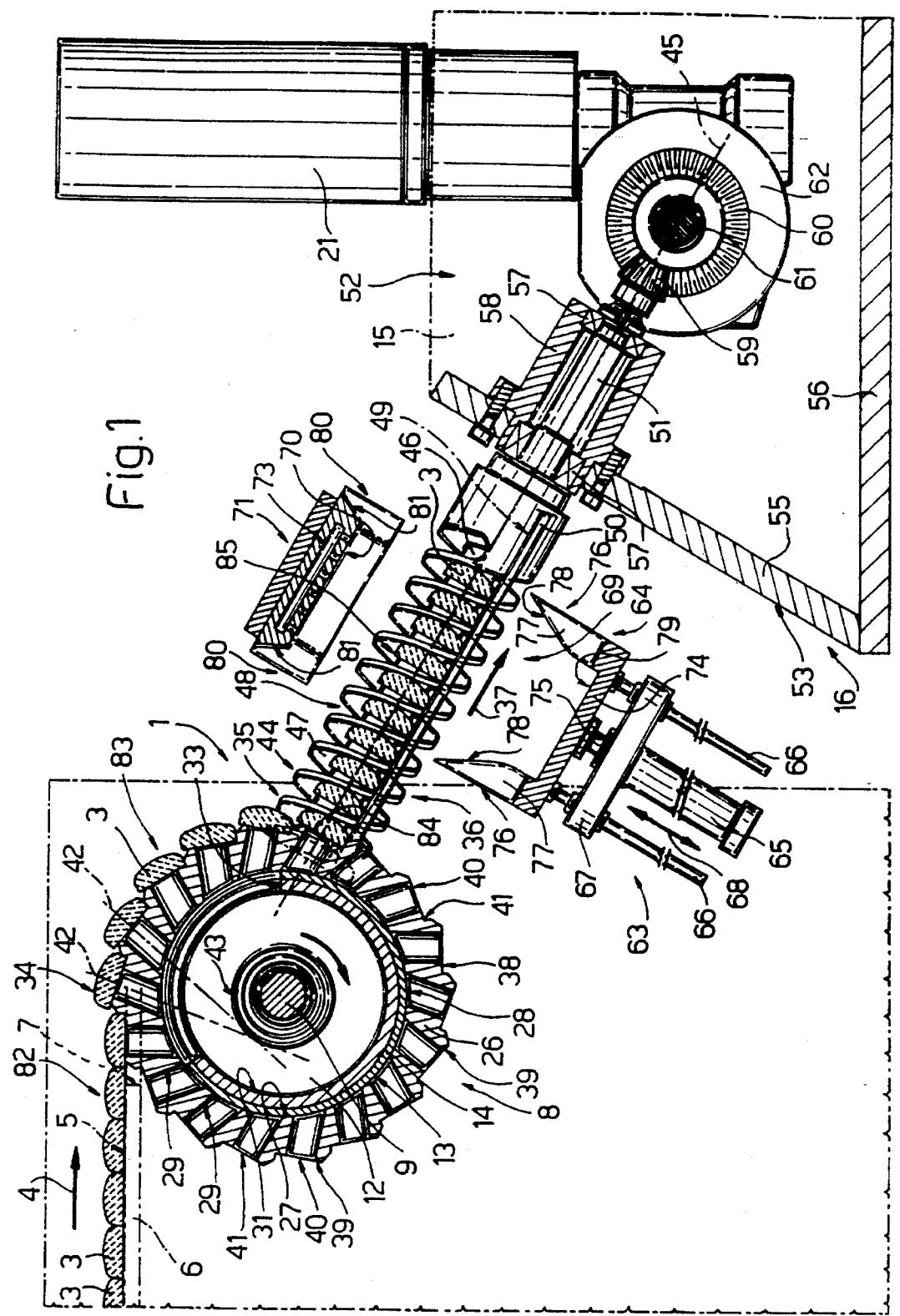
FIG. 1 shows a side view, with parts in section and parts removed for clarity, of a preferred embodiment of the device for forming groups of flat articles on edge according to the present invention.

Number 1 in FIG. 1 indicates a device for forming groups 2 (FIG. 3) of flat articles—in the example shown, elongated biscuits 3 having predetermined thickness—laid flat, side by side, and fed, by a known push device (not shown), in direction 4 along a conveyor surface 5 defined by a plate 6 presenting, at the output end, a central front opening 7 engaged by the periphery of a conveyor wheel 8 forming part of device 1.

Figure 2:
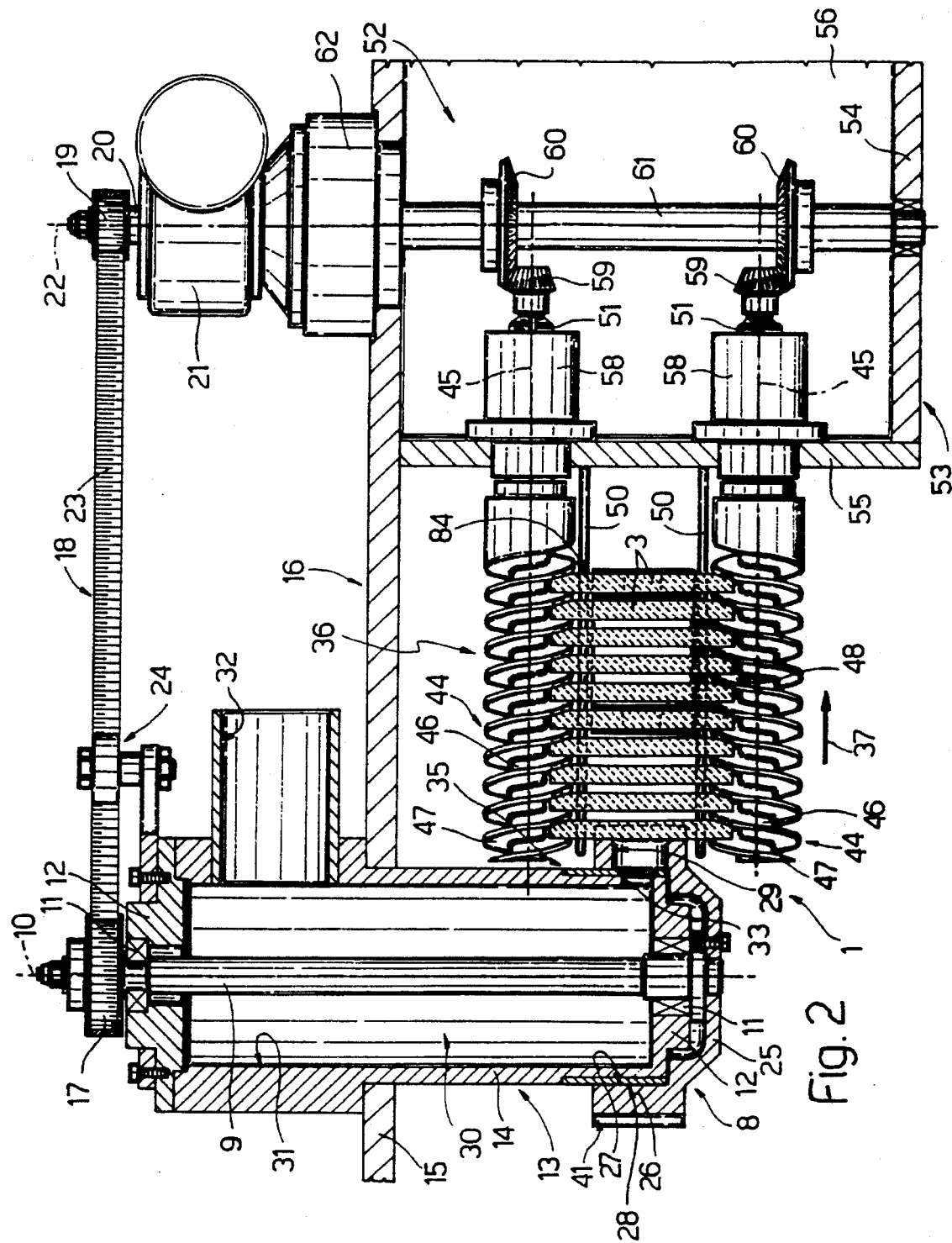
FIG. 2 shows a plan view, with parts in section and parts removed for clarity, of the FIG. 1 device.

Wheel 8 is fitted to a shaft 9 located beneath surface 5 and rotating clockwise (in FIG. 1) about a substantially horizontal axis 10 (FIG. 2) parallel to surface 5 and crosswise to direction 4. More specifically, and as shown in FIG. 2, via the interposition of bearings 11, shaft 9 is mounted for rotation through the end walls 12 of a drum 13, which comprises a cylindrical lateral wall 14 coaxial with axis 10 and fitted, in a fixed position, through a substantially vertical wall 15 of a fixed frame 16. A first end of shaft 9 projects from drum 13 and is fitted with a toothed pulley 17 forming part of a belt drive 18, which also comprises a second toothed pulley 19 fitted to the output shaft 20 of a motor 21 fitted to wall 15 and which provides for rotating shaft 20 about an axis 22 parallel to axis 10. Drive 18 also comprises a toothed belt 23 looped about pulleys 17 and 19 and presenting a tensioning device 24 fitted to drum 13.

As shown in FIGS. 1 and 2, wheel 8 is fitted to the end of shaft 9 projecting from respective end wall 12 of drum 13 and opposite the end fitted with pulley 17. Wheel 8 is substantially cup-shaped, and comprises an end wall 25 fitted through with and to shaft 9; and a lateral wall defining an annular rim 26 extending about axis 10 and defined internally by a cylindrical surface 27 mounted so as to slide in fluidtight manner and in contact with the outer surface 28 of wall 14. Rim 26 presents through suction holes 29 cooperating with a suction device 30 comprising an inner chamber 31 of drum 13, and a radial conduit 32 extending from drum 13 and connected (in known manner not shown) to a known suction source (not shown). Inside rim 26, wall 25 presents a slot 33 permitting communication between holes 29 and chamber 31 along a suction or transportation arc extending roughly 90° about axis 10 and between a pickup station 34 defined on surface 5 by opening 7, and a transfer station 35 wherein wheel 8 cooperates with the input of a conveyor 36 described in more detail later on and which provides for feeding biscuits 3 in a direction 37 crosswise to axis 10 and perpendicular to axis 22.

As shown in FIG. 1, rim 26 engages opening 7, and presents an outer surface 38 extending about axis 10 and presenting a mean radius greater than the distance between axis 10 and surface 5. Surface 38 is substantially step-shaped, and presents a number of substantially L-shaped seats 39 equally spaced about axis 10 and each presenting a bottom surface 40 defined at the front end, in the rotation direction of wheel 8, by a shoulder surface 41. Each surface 40 presents a respective through hole 29, the axis 42 of which is perpendicular to surface 40, is tangent to a circumference 43 coaxial with axis 10 and of a smaller radius than wheel 8, and forms, with each of the axes 42 of the two adjacent holes 29, an angle smaller than the angle at the center of wheel 8 subtending an arc equal to the spacing of seats 39 on surface 38. As shown in FIG. 1, the slope of surfaces 40 and the orientation of directions 4 and 37 are such that each surface 40 is coplanar with surface 5 when seat 39 is in pickup and is perpendicular to direction 37 when seat 39 is in transfer station 35. Also as shown in FIG. 1, the width of each seat 39, measured perpendicular to shoulder surface 41, is approximately equal to but no more than the width of biscuit 3.

As shown in FIGS. 1 and 2, conveyor 36 comprises two screws 44 presenting respective axes 45 parallel to direction 37, defining a plane parallel to axes 10 and 22, and located on either side of rim 26. Each screw 44 comprises a central core 46 coaxial with respective axis 45; and at least one outer projection 47 coiled about and forming a number of successive turns along core 46. Each corresponding pair of successive turns of the two screws 44 defines a conveyor pocket 48 for a respective biscuit 3 which, as respective pocket 48 moves in direction 37, presents its opposite ends engaged between the respective pairs of turns of screws 44, and its central portion resting on a conveyor surface 49 defined by two guide rods 50 located between screws 44, beneath cores 46, and parallel to direction 37. Each screw 44 presents its free end facing the periphery of wheel 8 at transfer station 35, and the other end connected integral with a respective shaft 51 coaxial with respective core 46 and connected to a drive device 52. Device 52 comprises a casing 53 defined by wall 15, by a wall 54 parallel to wall 15, by at least one wall 55 crosswise to walls 15 and 54 and perpendicular to direction 37, and by an end wall 56. Via the interposition of respective bearings 57, each shaft 51 is mounted for rotation through a respective sleeve 58 fitted to the inner surface of wall 55 and coaxial with respective axis 45, and presents an end portion projecting from sleeve 58 and fitted with a bevel pinion 59. Pinions 59 mesh with respective bevel gears 60 fitted to a shaft 61 coaxial with axis 22, mounted for rotation through walls 15 and 54, and forming the output shaft of a reduction gear 62 connected to motor 21.

Figure 3:
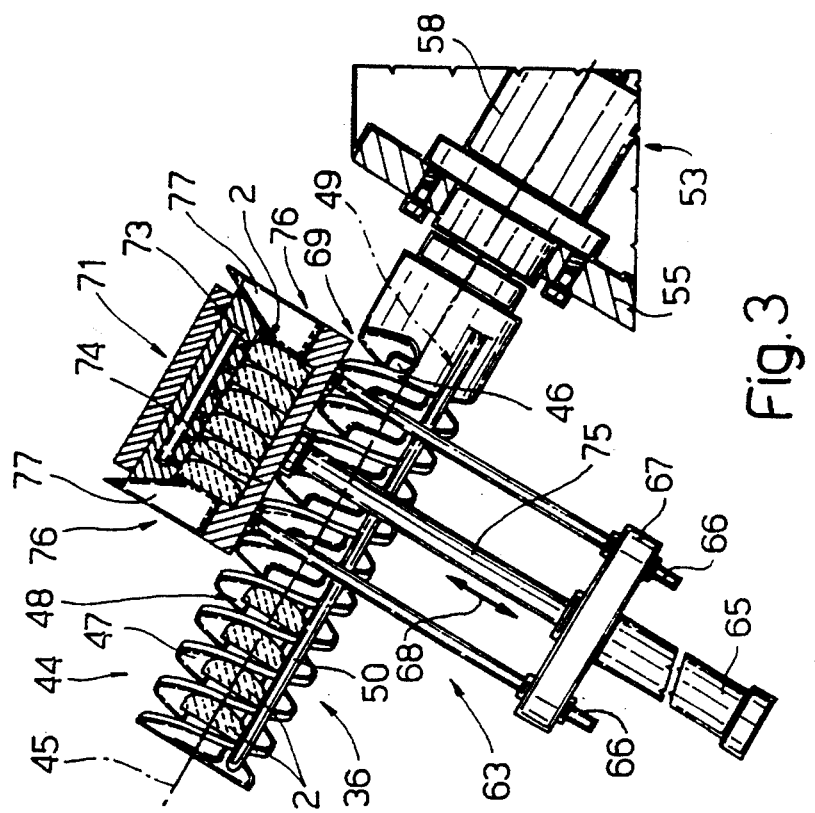
FIG. 3 shows a partially sectioned side view of a detail in FIG. 1 in a different operating position.
Figure 4:
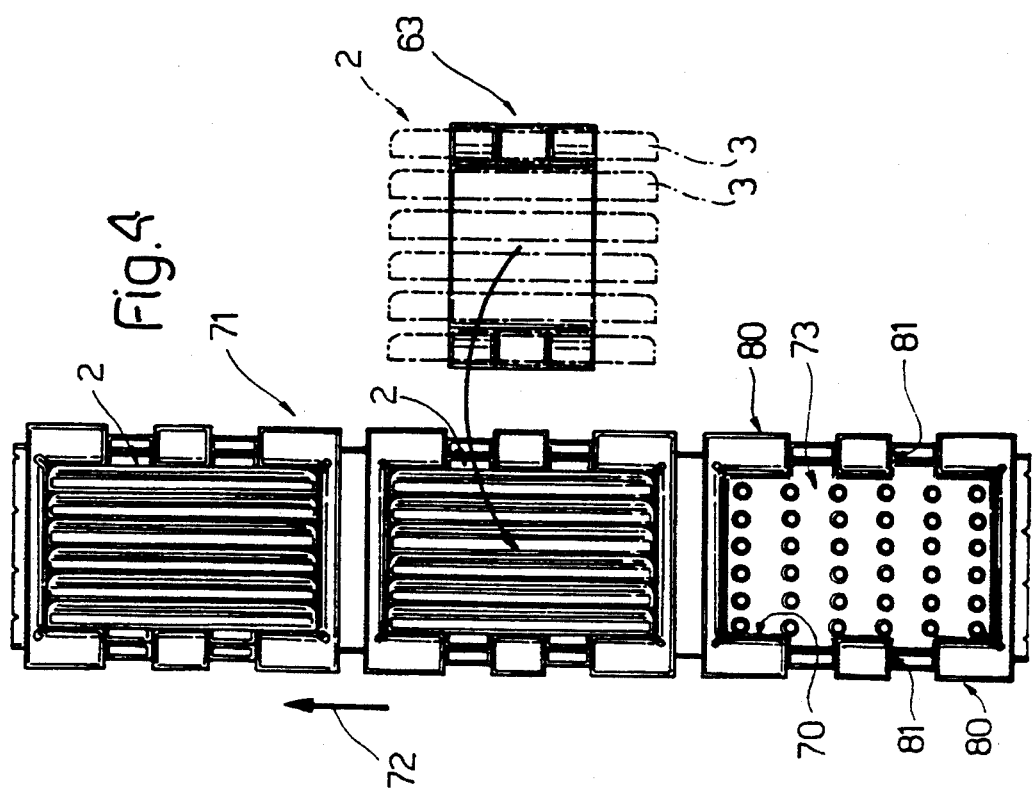
FIG. 4 shows a bottom plan view of a further detail in FIG. 1.

As shown in FIGS. 1 and 3, device 52 also comprises an extracting and compacting device 63 facing an intermediate portion of conveyor 36, and in turn comprising an extracting-compacting member 64 which, by means of an actuator 65 and two guide rods 66 fitted in sliding manner through a cross member 67 supporting actuator 65, is moved back and forth in a direction 68 perpendicular to the plane defined by axes 45 and therefore perpendicular to direction 37. More specifically, member 64 is movable through conveyor 36, in the space between rods 50 and at an extracting station 69, between a lowered idle position (FIG. 1) beneath conveyor 36, and a raised operating position over conveyor 36 and wherein member 64 engages a pocket 70 of a pocket conveyor 71 traveling in steps in a direction 72 (FIG. 4) crosswise to directions 37 and 68, and each pocket 70 of which provides for receiving and retaining, by means of a suction device 73, a group 2 of biscuits 3 arranged side by side on edge and contacting one another.

Member 64 is substantially U-shaped, and comprises a substantially rectangular plate 74 perpendicular to direction 68 and integral with the free end of the output rod 75 of actuator 65; and two comb-like lateral arms 76 extending in direction 68 from the opposite ends of plate 74 and crosswise to direction 37. Each arm 76 is defined by a number of teeth 77 presenting respective inclined inner edges 78 and defining a movable pocket 79 tapering towards plate 74. More specifically, pocket 79 is deeper than the width of biscuit 3, and presents an inlet of a width, measured in direction 37, equal to a multiple of the width of pocket 48, and a bottom of a width, measured in direction 37, equal to the total thickness of the same number of biscuits 3.

In connection with conveyor 71, it should be pointed out that each pocket 70 presents comb-like lateral walls 80 in turn presenting slots 81 which are engaged by respective teeth 77 when member 64 is in the raised operating position.

In actual use, biscuits 3 are fed along conveyor surface 5 to pickup station 34 by a known push device (not shown), and form a first succession 82 wherein they are arranged substantially contacting one another and with a first spacing substantially equal to the width of biscuits 3.

As wheel 8 rotates, surfaces 40 of seats 39 are successively positioned coplanar with surface 5 inside opening 7. More specifically, upon surface 40 of seat 39 moving into said coplanar position, the biscuit 3 on surface 5 and across opening 7 moves along surfaces 5 and 40 until it is arrested against respective shoulder surface 41, and is raised by wheel 8 which retains it by suction on seat 39.

Biscuits 3 are successively lifted off surface 5 at pickup station 34, and are fed forward by wheel 8 to form, on wheel 8, a second succession 83 presenting a second spacing equal to the spacing of seats 39 about axis 10, and which is fed by wheel 8 to transfer station 35 by rotating roughly 90° about axis 10.

Upon seat 39 reaching station 35, the suction through hole 29 is cut off entirely upon surface 40 moving into a plane 84 perpendicular to the traveling direction 37 of conveyor 36; and biscuit 3 is released into a pocket 48 on conveyor 36, the screws 44 of which are rotated by motor 21 in time with wheel 8, i.e. in such a manner that the next seat 39 enters station 35 simultaneously with the formation of a further pocket 48 at station 35.

Biscuits 3 are fed by conveyor 36 to withdrawal station 69, and form, on conveyor 36, a third succession 85 which, in view of the position of plane 84 in relation to direction 37, consists of biscuits 3 arranged on edge, and presents a third spacing equal to that of pockets 48. Upon a group 2 of a predetermined number of biscuits 3 entering station 69, actuator 65 is operated to move extracting member 64 through conveyor 36 and into the raised operating position; in the course of which movement, the group 2 of biscuits 3 engaged by member 64 is lifted off conveyor 36, penetrates gradually inside pocket 79, and is compacted to bring biscuits 3 into contact with one another, prior to being transferred into a pocket 70 on conveyor 71.

As such, biscuits 3 are transferred from surface 5 into pockets 70 without ever being abandoned by device 1, and without covering any distance in uncontrolled manner or by force of gravity. Moreover, downstream from surface 5, biscuits 3 are never brought into contact with one another except at the final stage wherein groups 2 are fed into respective pockets 70, thus substantially eliminating any possibility of biscuits 3 being damaged by colliding uncontrollably with an obstacle or with one another.

I claim:

1. A method of forming groups (2) of flat articles (3) on edge, the articles having a predetermined thickness, and the method comprising the step of feeding a first succession (82) of said articles (3), laid flat on a conveyor surface (5) and with a first spacing, in a first given direction (4) to a pickup station (34); removing the articles (3) one by one off the conveyor surface (5) and from the first succession (82) at the pickup station (34), to form a second succession (83) wherein the articles (3) are equally spaced with a given second spacing; feeding the second succession (83) to a transfer station (35) in such a manner that each article (3) in the second succession (83) lies in a given plane (84) at the transfer station (35); feeding the articles (3) from the transfer station (35) to a withdrawal station (69) in a second direction (37) substantially perpendicular to said plane (84), to form a third succession (85) wherein the articles are arranged on edge in relation to one another and are equally spaced with a third spacing larger than said thickness so as to assure the existence of a clearance between adjacent articles in said third succession; successively forming groups (2), each comprising a number of said articles (3) on edge, by withdrawing each said number of articles (3) from said third succession (85) in a third direction (68) crosswise to said second direction (37), said second and third directions (37, 68) extending in a substantially vertical plane; and compacting each said number of articles (3) to eliminate said clearances.

2. A method as claimed in claim 1, characterized in that said third direction (68) presents a vertical upward component.

3. A method as claimed in claim 1, characterized in that the step of removing the articles (3) one by one off the conveyor surface (5) comprises the step of lifting the articles (3) one by one off the conveyor surface (5).

4. A method as claimed in claim 1, characterized in that the step of removing the articles (3) one by one off the conveyor surface (5) comprises the steps of feeding a succession of seats (39), presenting said second spacing and each for receiving a respective said article (3) laid flat in relation to the seat (39), along a given path extending through the pickup and transfer stations (34, 35), each seat (39) assuming, at the pickup station (34), a position coplanar with the conveyor surface (5); feeding each article (3) in the first succession (82) along the conveyor surface (5) and on to a respective said seat (39) at the pickup station (34); arresting and retaining each article (3) on the respective said seat (39) and in a given position in relation to the seat (39); and feeding said seat (39) to the transfer station (35).

5. A method as claimed in claim 4, characterized in that the removal of one article (3) off the conveyor surface (5) by a respective said seat (39) is accompanied by simultaneous engagement of at least the next article (3) in the first succession (82) on the conveyor surface (5).

6. A method as claimed in claim 4, characterized in that said path is a curved path; each said seat (39) being rotated by a given angle as it is transferred between the pickup and transfer stations (34, 35).

7. A method as claimed in claim 6, characterized in that said given angle is approximately 90°.

8. A method as claimed in claim 6, characterized in that said path is a circular path extending about a substantially horizontal axis (10) crosswise to said second direction (37).

9. A method as claimed in claim 1, characterized in that said articles (3) are fed from the transfer station (35) to the withdrawal station (69) by a pocket conveyor (36), the pockets (48) of which present said third spacing; each said pocket (48) receiving a respective article (3) at the transfer station (35), being fed in said second direction (37) to the withdrawal station (69), and maintaining the respective article (3) on edge in relation to the other articles (3) in said third succession (85) as it is fed to the withdrawal station (69).

10. A device for forming groups (2) of flat articles (3) on edge, the articles having a predetermined thickness, and the device comprising a conveyor surface (5) for a first succession (82) of said articles (3) laid flat and traveling with a first spacing in a first given direction (4); first conveyor means (8) for successively transferring said articles (3) between a pickup station (34) on the conveyor surface (5) and a transfer station (35), the first conveyor means (8) presenting a succession of seats (39) for respectively receiving said articles (3), laid flat, at the pickup station (34), and for feeding them to the transfer station (35) in a second succession (83) wherein the articles (3) are equally spaced with a second spacing, and in such a manner that each article (3) lies in a given plane (84) at the transfer station (35); second conveyor means (36) for feeding said articles (3) from the transfer station (35) in a second direction (37) perpendicular to said plane (84), and forming a third succession (85) wherein the articles (3) are equally spaced with a third spacing, said second conveyor means being designed so as to assure the existence of a clearance between adjacent articles in said third succession; and extracting means (63) for withdrawing groups (2) of said articles (3) on edge from the second conveyor means (36) in a third direction (68) crosswise to said second direction (37); said second and third directions (37, 68) extending in a substantially vertical plane with said third direction (68) presenting an upward component; and said extracting means (63) comprising an extracting element (64) defining a pocket (79) for a respective said group (2), actuating means (65) for moving the extracting element (64) back and forth in said third direction (68) and through the second conveyor means (36) and compacting means (77, 78) on said extracting element (64) for compacting said group (2).

11. A device as claimed in claim 10, characterized in that said first conveyor means (8) comprise a wheel (8) rotating about an axis (10) crosswise to said directions (4, 37, 68); said wheel (8) presenting a peripheral surface (38); and said seats (39) being formed on the peripheral surface (38).

12. A device as claimed in claim 11, characterized in that said seats (39) are equally spaced with said second spacing about said peripheral surface (38) which is step-shaped; each step lying in a plane (40) forming, with the plane (40) of each of the two adjacent steps, a constant angle smaller than the angle at the center subtending an arc equal to said second spacing.

13. A device as claimed in claim 12, characterized in that said step planes (40) present respective perpendicular axes (42) tangent to a circumference (43) coaxial with the rotation axis (10) of the wheel (8).

14. A device as claimed in claim 12, characterized in that each said step plane (40) is coplanar with said conveyor surface (5) when the respective seat (39) is in the pickup station (34), and is parallel to said given plane (84) when the respective seat (39) is in the transfer station (35).

15. A device as claimed in claim 10, characterized in that said given plane (84) forms an angle of approximately 90° with said conveyor surface (5).

16. A device as claimed in claim 10, characterized in that each said seat (39) is a suction seat (39).

17. A device as claimed in claim 10 characterized in that each said seat (39) comprises stop means (41) for a respective said article (3); the stop means (41) of each seat (39) being crosswise to said first direction (4) when the seat (39) is in the pickup station (34).

18. A device as claimed in claim 10 characterized in that said second conveyor means (36) comprise two counter-rotating screws (44); each screw (44) comprising a central core (46), and at least one outer projection (47) coiled about and forming a number of successive turns along the core (46); each corresponding pair of successive turns of said two screws (44) defining a conveyor pocket (48) for a respective said article (3).

19. A device as claimed in claim 18, characterized in that said second conveyor means (36) also comprise guide elements (50) defining a further conveyor surface (49) for said articles (3) located, in use, between the transfer and withdrawal stations (35, 69).

20. A device for forming groups (2) of flat articles (3) on edge, the device comprising: a conveyor surface (5) for a first succession (82) of said articles (3) laid flat and traveling with a first spacing in a first given direction (4); first conveyor means for successively transferring said articles (3) between a pickup station (34) on the conveyor surface (5) and a transfer station (35), the first conveyor means (8) presenting a succession of seats (39) for respectively receiving said articles (3), laid flat, at the pickup station (34), and for feeding them to the transfer station (35) in a second succession (83) wherein the articles (3) are equally spaced with a second spacing and in such a manner that each article (3) lies in a given plane (84) at the transfer station (35); second conveyor means (36) for feeding said articles (3) from the transfer station (35) in a second direction (37) perpendicular to said plane (84), and forming a third succession (85) wherein the articles (3) are equally spaced with a third spacing; and extracting means (63) for withdrawing groups (2) of said articles (3) on edge from the second conveyor means (36) in a third direction (68) crosswise to said second direction (37), said extracting means (63) comprising an extracting element (64) defining a pocket (79) for a respective said group (2), actuating means (65) for moving the extracting element (64) back and forth in said third direction (68) and through the second conveyor means (36) and compacting means (77, 78) on said extracting element (64), for compacting said group (2).

21. A device as claimed in claim 20, characterized in that said compacting means (77, 78) comprise two fork arms (76) of said extracting element (64); said two arms (76) presenting inclined inner edges (78) for tapering said pocket (79) towards the bottom wall (74) of the pocket (79).

22. A device as claimed in claim 21, characterized in that it also comprises third conveyor means (71) for successively receiving said groups (2) of articles (3) on edge.

23. A device as claimed in claim 22, characterized in that said third conveyor means (71) are suction pocket conveyor means; each pocket (70) presenting lateral walls (80) in turn presenting slots (81) engaged by said arms (76).

24. A method of forming groups of flat articles on edge, which method comprises feeding a first succession of said articles, laid flat on a conveyor surface and traveling with a first spacing in a first given direction to a pickup station, successively transferring the articles off the conveyor surface onto a first conveyor means presenting a succession of seats for respectively receiving the articles, laid flat, at the pickup station, and feeding them by the first conveyor means in a second succession wherein the articles are equally spaced with a second spacing and in such a manner that each article lies in a given plane at the transfer station, transferring the articles from the transfer station to a second conveyor means and using the second conveyor means to feed the articles from the transfer station in a second direction perpendicular to said plane and forming a third succession wherein the articles are equally spaced with a third spacing, and extracting groups of articles on edge from the second conveyor means in a third direction crosswise to the second direction by moving an extracting element back and forth in said third direction and through the second conveyor means and compacting the group into a pocket.

* * * * *